US010850338B2

(12) United States Patent
Zheng

(10) Patent No.: US 10,850,338 B2
(45) Date of Patent: Dec. 1, 2020

(54) ELECTRIC POWER TOOL

(71) Applicant: Bosch Power Tools (China) Co. Ltd., Zhejiang (CN)

(72) Inventor: Weixin Zheng, Zhejiang (CN)

(73) Assignees: Bosch Power Tools (China) Co., Ltd., Hangzhou (CN); Robert Bosch GmbH, Stuttgart (DE)

( * ) Notice: Subject to any disclaimer, the term of this patent is extended or adjusted under 35 U.S.C. 154(b) by 199 days.

(21) Appl. No.: 16/013,832

(22) Filed: Jun. 20, 2018

(65) Prior Publication Data

US 2018/0370012 A1    Dec. 27, 2018

(30) Foreign Application Priority Data

Jun. 26, 2017   (CN) .......................... 2017 1 0493151

(51) Int. Cl.
  *B23D 51/16*   (2006.01)
  *B25D 17/24*   (2006.01)
  *B25D 11/12*   (2006.01)
  *B23D 49/00*   (2006.01)
  *B25F 5/00*    (2006.01)
  *F16F 15/22*   (2006.01)
  (Continued)

(52) U.S. Cl.
  CPC .......... *B23D 51/16* (2013.01); *B23D 49/007* (2013.01); *B25D 11/12* (2013.01); *B25D 17/24* (2013.01); *B25F 5/006* (2013.01); *F16F 15/22* (2013.01); *F16F 15/28* (2013.01); *B23D 49/16* (2013.01); *B25D 2217/0088* (2013.01); *F16F 2222/08* (2013.01); *F16F 2232/08* (2013.01)

(58) Field of Classification Search
  CPC ...... A01G 3/0475; A01G 3/053; B23D 51/16; B23D 49/007; F16F 15/28; B25D 2217/0076; B25D 2217/0088
  USPC ................... 30/208–210, 215–220, 392–394
  See application file for complete search history.

(56) References Cited

U.S. PATENT DOCUMENTS 3,750,483 A * 8/1973 Burrows ................. B23D 51/16
                                                          30/392
3,802,079 A * 4/1974 Ketchpel, Jr. .......... B23D 51/16
                                                          30/394
(Continued)

FOREIGN PATENT DOCUMENTS

DE    102018209410 A1 * 12/2018   ............. B23D 51/16

*Primary Examiner* — Jason Daniel Prone
(74) *Attorney, Agent, or Firm* — Maginot, Moore & Beck LLP

(57) ABSTRACT

An electric power tool includes a drive device for providing a driving force, a rotation wheel that has a central axis and is driven by the drive device to rotate around the central axis, a spindle that supports a tool holder configured to hold a tool of the electric power tool, a first intermediate member, a second intermediate member, and a counterweight device. The first intermediate member is offset from the central axis of the rotation wheel, and revolves around the central axis when driven by the rotating rotation wheel, while driving the spindle to reciprocate in a first direction. The second intermediate member is driven by the first intermediate member to rotate around the central axis and is disposed to be offset from the central axis of the rotation wheel on the side opposite the first intermediate member. The counterweight device is driven by the second intermediate member.

20 Claims, 2 Drawing Sheets

(51) Int. Cl.
*F16F 15/28* (2006.01)
*B23D 49/16* (2006.01)

(56) References Cited

U.S. PATENT DOCUMENTS

| | | | | |
|---|---|---|---|---|
| 4,145,811 A * | 3/1979 | Kendzior | ............... | B23D 51/18 30/394 |
| 5,099,705 A * | 3/1992 | Dravnieks | ............... | B23D 51/02 30/392 |
| 5,134,777 A * | 8/1992 | Meyer | ................... | B23D 51/16 30/392 |
| 5,212,887 A * | 5/1993 | Farmerie | ............... | B23D 51/16 30/392 |
| RE35,258 E * | 6/1996 | Palm | ...................... | B23D 51/16 30/392 |
| 6,810,589 B2 * | 11/2004 | Lagaly | .................. | B23D 51/16 30/392 |
| 7,191,847 B2 * | 3/2007 | Haas | ..................... | B23D 51/16 30/394 |
| 7,216,433 B2 * | 5/2007 | Haas | ..................... | B23D 51/16 30/392 |
| 7,363,713 B2 * | 4/2008 | Hirabayashi | .......... | B23D 51/16 30/392 |
| 7,814,666 B2 * | 10/2010 | Oberheim | ............. | B23D 51/16 30/392 |
| 7,996,996 B2 * | 8/2011 | Hirabayashi | .......... | B23D 51/16 30/392 |
| 8,549,762 B2 * | 10/2013 | Oberheim | ............. | B23D 51/16 30/392 |
| 8,640,347 B2 * | 2/2014 | Baxivanelis | .......... | B23D 51/16 30/392 |
| 10,328,506 B2 * | 6/2019 | Naoi | ...................... | B23D 51/16 |
| 10,357,425 B2 * | 7/2019 | Wersland | ........... | A61H 23/0254 |
| 10,471,525 B2 * | 11/2019 | Haas | ..................... | B23D 51/16 |
| 2004/0117993 A1 * | 6/2004 | Armstrong | ............ | B23D 51/16 30/392 |
| 2008/0010840 A1 * | 1/2008 | Lagaly | .................. | B23D 51/16 30/392 |
| 2015/0367494 A1 * | 12/2015 | Wang | ..................... | B25F 5/006 30/392 |

* cited by examiner

ELECTRIC POWER TOOL

This application claims priority under 35 U.S.C. § 119 to patent application number CN 201710493151.9 filed on Jun. 26, 2017 in China, the disclosure of which is incorporated herein by reference in its entirety.

TECHNICAL FIELD

The present application relates to the field of electric power tools, and more particularly to an electric power tool that outputs reciprocating motion.

BACKGROUND ART

Common electric power tools, such as electric hammers, reciprocating saws, etc., all comprise a drive device that outputs rotational motion, an action device that outputs reciprocating motion, and a motion conversion mechanism that converts the rotational motion of the drive device into the reciprocating motion of the action device.

The action device of this type of electric power tools performs reciprocating impact or reciprocating cutting operations on the target workpiece by performing reciprocating motion. When the action device is driven to reciprocate, the direction of motion is changed frequently, and the inertia of the action device that frequently changes its direction of motion causes the electric power tool to vibrate, thereby reducing the service life of the electric power tool. It is also easy to cause physical fatigue damage to operators and, at the same time, to affect the comfort of the operators in operating the electric power tool.

In order to reduce the vibration of the electric power tools and thereby achieve the desired operating performance, many efforts have been made by those skilled in the art.

For example, in the prior art, there is a reciprocating saw provided with a counterweight device. During the operation of the electric power tool, the counterweight device performs a rotary motion, so the centrifugal force generated by the rotary motion thereof not only counterbalances the inertia force in the direction of the reciprocating motion of the action device of the electric power tool when the action device performs reciprocation, but also comprises a force component in a direction perpendicular to this direction. Therefore, while such a counterweight structure makes the electric power tool eliminate the vibration caused by the action device, the counterweight device itself causes further vibration. For another example, to further counterbalance the centrifugal force component of the counterweight device in the perpendicular direction as described above, another reciprocating saw is further provided with another similar counterweight device to counterbalance the force component in the perpendicular direction caused by the counterweight device. However, this structure is obviously more complicated.

In addition, in another type of existing reciprocating saw, the counterweight device reciprocates in opposition to the action device in the direction of the reciprocating motion of the action device, effectively avoiding the introduction of the additional force the perpendicular direction due to the counterweight device. However, due to the size limitation of the rotation wheel, the eccentricity of the counterweight device cannot be too large and therefore the mass of the counterweight device cannot be too small. On the contrary, if the eccentricity is to be increased so as to reduce the mass of the counterweight, the structure and the size of the rotation wheel need to be modified, in particular increased.

All of the three structures have the disadvantages of complicated structure, large number of components, and large mass of the counterweight device, thus making the size and mass of the electric power tool itself larger.

It is desired that the above technical problems be solved.

SUMMARY OF THE INVENTION

It is an object of the present invention to provide a structure that can not only eliminate or substantially eliminate the vibration of an electric power tool that outputs reciprocating motion, but can also greatly simplify the structure and reduce the mass of the counterweight, or at least provide an option for users.

To this end, the present invention provides an electric power tool, comprising: a drive device for providing a driving force; a rotation wheel, which has a central axis and is driven by the drive device to rotate around the central axis; a spindle supporting a tool holder, the tool holder being configured to hold a tool of the electric power tool; a first intermediate member, which is offset from the central axis of the rotation wheel, and drives the spindle to reciprocate while being driven by the rotating rotation wheel to revolve around the central axis; a second intermediate member, which is driven by the first intermediate member to rotate around the central axis, and is disposed to be offset from the central axis of the rotation wheel on the side opposite the first intermediate member; and a counterweight device, which is driven to move by the second intermediate member.

Advantageously, an offset distance between the second intermediate member and the central axis can be equal to or greater than an offset distance between the first intermediate member and the central axis. The counterweight device is driven by the second intermediate member to reciprocate in opposition to the spindle.

The electric power tool according to the present invention comprises a novel counterweight device. Advantageously, on the one hand, the novel counterweight device is configured to only perform reciprocating motion in the reciprocating direction of the action device of the electric power tool and in opposition to that of the action device, without any rotational motion, without generating any centrifugal force, and without generating any inertia force in the direction perpendicular to the motion direction. This effectively counterbalances the inertia force of the action device in the substantially linear motion direction, and does not introduce any other load that may cause the vibration of the electric power tool, thus fundamentally solving the problems existing in the prior art. Therefore, this structure effectively reduces the vibration generated by the electric power tool and prevents the electric power tool from damaging internal components due to the vibration, which not only prolongs the service life of the electric power tool, but also enables the operator to operate comfortably. On the other hand, this structure is simple, and the eccentricity of the counterweight member from the central axis of the rotation wheel can be set as required, so as to minimize the mass of the counterweight member and reduce or lower the volume, mass and costs of the electric power tools to a minimum.

BRIEF DESCRIPTION OF THE DRAWINGS

The above and other features and advantages of the present application can be better understood from the following description of the preferred embodiments of the present application, in conjunction with the accompanying drawings, in which.

DETAILED DESCRIPTION OF EMBODIMENTS

As used herein, the term "electric power tool" includes, but is not limited to, reciprocating saws and hammers. Other types of portable electric power tools having the same or similar technical problems in the prior art are also included in the scope of the present invention, and the scope of the present invention is defined only by the claims.

In general, the electric power tool according to the present invention comprises a drive device that outputs rotational motion, an action device that performs reciprocating motion, and a motion conversion mechanism that converts the rotational motion of the drive device into the reciprocating motion of the action device. In order to avoid or minimize the vibration of the electric power tool caused by the inertia force of the reciprocating action device, the electric power tool of the present invention comprises a novel motion conversion mechanism. In the novel motion conversion mechanism of the present invention, the counterweight device is configured to reciprocate in opposition to the action device in the reciprocating direction of the action device, whereby the inertia force of the action device of the electric power tool in the reciprocating direction is counterbalanced by the inertia force of the counterweight device in the reciprocating direction, but no force is generated in the perpendicular direction perpendicular to the reciprocating direction. In this way, the above technical problems existing in conventional electric power tools as described in the prior art are fundamentally solved.

An electric power tool according to the present invention will be described in detail below with reference to FIGS. 1 and 2 by taking a reciprocating saw as an example. In applications where the electric power tool is a reciprocating saw, the action device is a spindle 30 that supports a tool holder 35, wherein the tool holder 35 is used for holding a tool, in particular a saw blade, of the electric power tool.

Figure 1:
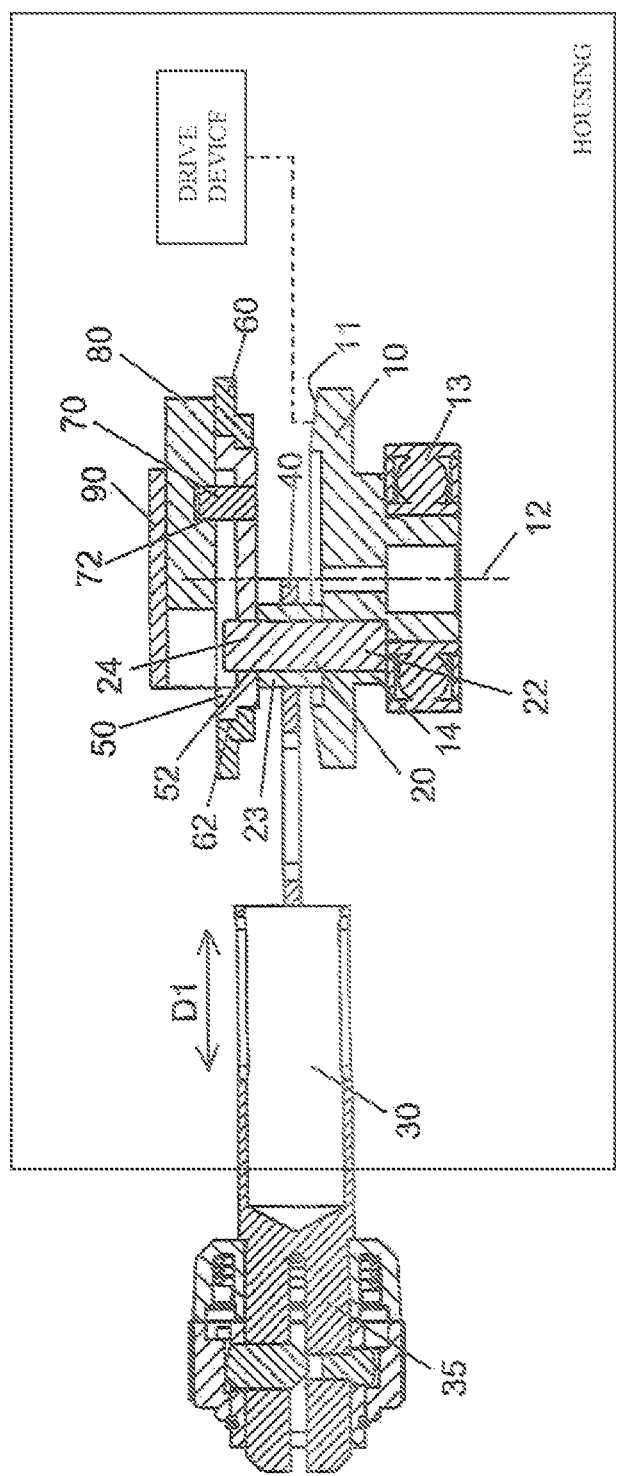
FIG. 1 is an assembled sectional view of a portion of a reciprocating saw according to the present invention.
Figure 2:
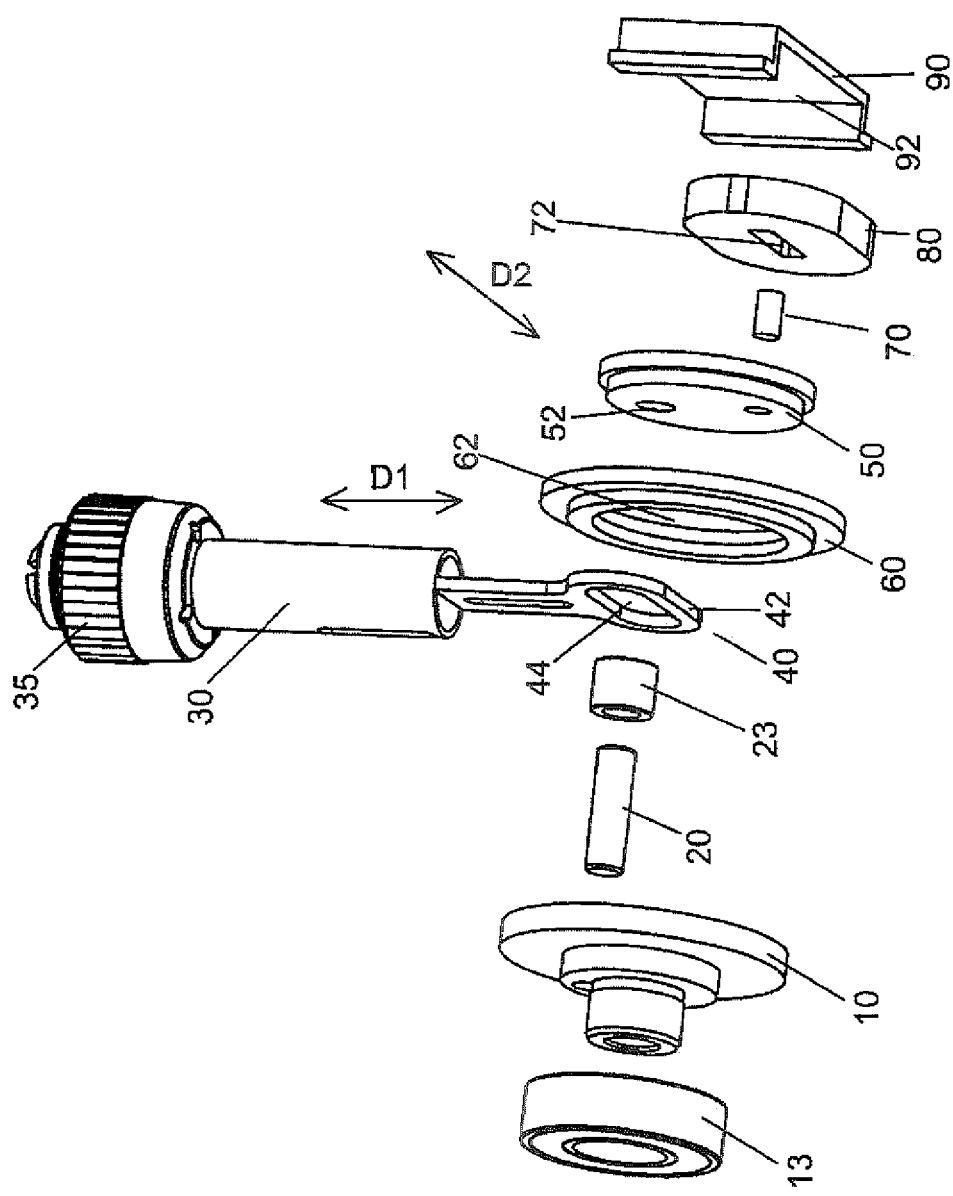
FIG. 2 is an exploded perspective view of a portion of the reciprocating saw according to the present invention.

FIG. 1 shows an assembled sectional view of a portion of a reciprocating saw according to the present invention, and FIG. 2 shows an exploded perspective view of a portion of the reciprocating saw according to the present invention.

In order to better highlight the innovative aspects of the reciprocating saw according to the invention, the drive device of the reciprocating saw is shown schematically in FIG. 1. However, those skilled in the art understand that the drive device may be an electric motor, such as a DC drive motor, which outputs rotary motion through an output shaft.

FIGS. 1 and 2 show a rotation wheel 10 driven by the drive device, in particular by an output shaft of an electric motor. The rotation wheel 10 has a central axis 12 as its own axis of rotation. The rotation wheel 10 is rotatably supported in a housing of the electric power tool shown schematically in FIG. 1, and rotates around the central axis 12 when driven by the drive shaft of the electric motor. In FIG. 1, engagement teeth 11 on the rotation wheel 10 that mesh with the output shaft of the electric motor (depicted schematically as a dashed line) and a bearing 13 that supports the rotation wheel 10 are shown.

A pin 20 is provided on the rotation wheel 10 at a first eccentricity from the central axis 12, and the pin 20 is mounted on the rotation wheel 10 to rotate along with the rotation wheel 10 around the central axis 12. Specifically, a first end 22 of the pin 20 is fixed to the rotation wheel 10, which can be achieved by press fit, as shown, and accordingly, the rotation wheel 10 comprises a press-fit hole 14 for this purpose. Alternatively, the fixation of the pin 20 to the rotation wheel 10 can be achieved by any other suitable mechanism known in the art.

The spindle 30, as a part of the action device of the reciprocating saw, is configured to be driven by the pin 20. The pin 20 drives the spindle 30 to reciprocate in the reciprocating direction of the action device when rotating around the central axis 12 of the rotation wheel 10. Herein, the direction of the reciprocating motion is substantially a first direction D1.

Specifically, the spindle 30 is pivotally joined to the pin 20 by an end engagement structure 40, such that when the pin 20 is driven to rotate around the central axis 12 of the rotation wheel 10, the pin 20 can pivot relative to the end engagement structure 40, while the end engagement structure 40, i.e. the spindle 30, reciprocates in the first direction D1.

The end engagement structure 40 may be integral with the spindle 30, or alternatively, may be a separate structure that is formed separately and then attached to the spindle 30. The end engagement structure 40 may be directly pivotally engaged with the pin 20 without any intermediate member. Alternatively, as shown in FIGS. 1 and 2, the end engagement structure 40 may be pivotally engaged with the pin 20 via an intermediate hub member 23.

Specifically, the end engagement structure 40 comprises a frame 42 and an elongated hole 44 formed in the frame 42. The elongated hole 44 extends in a second direction D2 perpendicular to the first direction D1. This structure is such that when the pin 20 is driven to rotate around the central axis 12 of the rotation wheel 10, the component in the first direction D1 of the force exerted by the rotation wheel 10 on the pin 20 drives the spindle 30 to move in the first direction, while the component in the second direction D2 of the force exerted by the rotation wheel 10 on the pin 20 drives the pin 20 to slide within the elongated hole 42 of the end engagement structure 40 along the elongated hole 42, i.e. along the second direction D2.

The reciprocating saw also comprises a disc member 50 that is driven by the pin 20. The disc member 50 has a central axis that is substantially coaxial with the axis of rotation 12 of the rotation wheel 10. When the pin 20 is driven to revolve around the central axis 12, the disc member 50 is driven to rotate around its own central axis, i.e. around the axis of rotation 12 of the rotation wheel 10.

The disc member 50 comprises a hole 52 adapted to receive a second end 24 of the pin 20. The second end 24 of the pin 20 is received within the hole 52 in a pivotable manner with respect to the disc member 50, such that the pin 20 can rotate in the hole 52 of the disc member 50 when rotating around the axis of rotation 12 of the rotation wheel 10, and at the same time drive the disc member 50 to rotate around the central axis 12.

The disc member 50 may be fixedly supported within the housing of the reciprocating saw, optionally directly supported by the housing, or supported on the housing of the reciprocating saw by an intermediate support member 60 as shown in the embodiment of the drawings.

The intermediate support member 60 is fixed to the housing of the electric power tool and has an internal hole 62 adapted to receive the disc member 50, the disc member 50 being driven by the pin 20 to rotate around the central axis 12 relative to the intermediate support member 60 within the hole 62 of the intermediate support member 60.

A pin 70 is provided on the disc member 50 at a distance from the central axis of the disc member 50, i.e. from the central axis 12. The pin 70 is attached to the disc member 50, so as to rotate along with the disc member 50 around the central axis 12 when the disc member 50 rotates.

The counterweight member 80 of the reciprocating saw according to the present invention is driven by the pin 70. Specifically, the counterweight member 80 comprises a receiving hole 72 adapted to receive the pin 70. The receiving hole 72 extends in an elongated manner in the second direction D2.

The reciprocating saw according to the present invention further comprises a counterweight guide member 90 that is fixed within the housing. The counterweight guide member 90 defines a sliding groove 92 that extends in the first direction D1, and the sliding groove 92 receives at least a portion or an entirety of the counterweight member 80 and allows same to slide in the first direction D1 within the sliding groove 92.

In this way, when the counterweight member 80 is driven by the pin 70 rotating around the central axis 12, for the first direction D1, the pin 70 causes the counterweight member 80 to slide in the first direction D1 within the sliding groove 92, while for the second direction D2, the pin 70 can slide in the second direction D2 in the receiving hole 72 of the counterweight member 80, so that the pin 70 does not generate any force component in the second direction D2 on the counterweight member 80.

With the structure in the illustrated embodiment, when the drive device of the reciprocating saw drives the rotation wheel 10 to rotate around the central axis 12, the pin 20 revolves around the central axis 12 along with the rotation wheel 10. On the one hand, rotation of the pin 20 around the central axis 12 drives the spindle 30 to move substantially in the first direction D1, and at the same time, since the pin 20 can slide in the second direction D2 relative to the spindle 30 within the elongated hole 44, the spindle 30 is not subjected to force in the second direction D2. On the other hand, rotation of the pin 20 around the central axis 12 drives the disc member 50 to rotate around its own central axis, i.e. around central axis 12, thereby driving the pin 70 to revolve around the central axis of the disc member 50, i.e. around the central axis 12. The rotation of the pin 70 around the central axis 12 drives the counterweight member 80 to move in the sliding groove 92 substantially in the first direction D1, and at the same time, since the pin 70 can slide relative to the counterweight member 80 in the receiving hole 72 in the second direction D2, the counterweight member 80 is not subjected to force in the second direction D2.

In the illustrated structure, the pin 20 and the pin 70 are located on opposite sides of the central axis 12, respectively, such that at any time during the operation of the reciprocating saw, the spindle 30 and the counterweight member 80 move in opposition in the first direction D1, and the inertia force of the spindle 30 in the first direction D1 and the inertia force of the counterweight member 80 in the first direction D1 are opposite to each other, thus realizing the counterbalance. For example, in the position shown in FIG. 1, the pin 20 is on the side of the central axis 12 that is close to the spindle 30, while the pin 70 is on the side of the central axis 12 that is away from the spindle 30.

In this way, during the operation of the reciprocating saw, the inertia force of the spindle 30 moving in the first direction D1 is counterbalanced by the inertia force of the counterweight member 80 moving in the first direction D1, eliminating the technical problem of vibration of the reciprocating saw caused by this reason. In addition, since the counterweight member 80 is not subjected to the force in the second direction D2, new vibration-causing factors will not be introduced as in the prior art, which fundamentally solves the technical problem.

According to the reciprocating saw of the present invention, the rotation wheel 10 drives the spindle 30 and the counterweight member 80 respectively by the first intermediate member (pin 20) and the second intermediate member (pin 70) that revolve around the same central axis 12, such that the spindle 30 and the counterweight member 80 reciprocate in opposition to each other in the first direction D1, achieving the technical object of the present invention without generating any force in the perpendicular direction.

More advantageously, the pin 70 driving the movement of the counterweight member 80 is driven by the rotation wheel 10 via the pin 20 offset from the central axis 12 of the rotation wheel 10, instead of being directly driven by the rotation wheel 10, and specifically, the pin 70 is separated from the rotation wheel 10. In this way, the position of the pin 70 is not limited by the size of the rotation wheel 10, so that the eccentricity of the pin 70 from the central axis 12 can be appropriately increased as required, and accordingly, the mass of the counterweight member 80 can be correspondingly decreased. As a result, the volume and mass of the saw and therefore the manufacturing costs can be reduced or lowered. Preferably, an offset distance between the second intermediate member and the central axis 12 can be equal to or greater than an offset distance between the first intermediate member and the central axis 12. In addition, such a structure contains fewer members and is simple in structure.

As an alternative embodiment, a reciprocating saw according to the principles of the present invention may have at least one of the following features:

the first intermediate member and the second intermediate member are not limited to the illustrated pins 20 and 70, and, alternatively, any structure that can achieve the same purpose can be used, and the first intermediate member and the second intermediate member may have any suitable shape and size;

the engaging structure for allowing the first intermediate member (pin 20) to slide in the second direction D2 relative to the spindle 30 is not limited to the illustrated structure, and, alternatively, the first intermediate member may comprise a hole, such that a portion of the spindle 30 is received in the hole of the first intermediate member and can slide therein;

the way that the pin 20 drives the pin 70 is not limited to the specific structure shown in the drawings;

one or both of the disc member 50 and the intermediate support member 60 may not be limited to the circular shape as shown in the drawings, and the engagement between the two is not limited to the form in which the disc member 50 is received in the hole of the intermediate support member 60;

the rotation wheel 10 may directly or indirectly drive the second intermediate member via a member different from the first intermediate member to cause the second intermediate member to revolve around the central axis 12;

the engaging structure for allowing the second intermediate member (pin 70) to slide in the second direction D2 relative to the counterweight member 80 is not limited to the illustrated structure, and, for example, the second intermediate member may comprise a hole, and a portion of the counterweight member 80 is received in the hole of the second intermediate member and can slide therein;

the second intermediate member, the counterweight member, and the disc member 50 may be integral, and the guide member 90 is removed at the same time, such that the counterweight member does not substantially linearly reciprocate as in the illustrated embodiment, but performs a rotary motion around the central axis; and in the illustrated example, in the direction along the central axis 12 of the rotation wheel 10, the rotation wheel 10 and the counterweight device 80 are located on opposite sides of the spindle 30, respectively.

The counterweight guide member 90 of the counterweight member 80 is not limited to the illustrated groove member structure, and a guide member of any other shape may be used, for example, the counterweight guide member 90 may also be a part of the housing.

The foregoing has described the preferred embodiments of the present invention, but the present invention is not intended to be limited to the embodiments described above and illustrated in the drawings. Without departing from the spirit and scope of the invention as defined in the following claims, those skilled in the art can make various modifications and variations to structural details and forms of the embodiments described above.

The invention claimed is:

1. An electric power tool, comprising:
a drive device;
a rotation wheel configured to be driven by the drive device to rotate around a central axis of the rotation wheel;
a spindle supporting a tool holder, the tool holder configured to hold a tool of the electric power tool;
a first intermediate member disposed on the rotation wheel and configured to drive the spindle to reciprocate in a first direction while being driven by the rotating rotation wheel to rotate around the central axis, the first intermediate member offset from the central axis of the rotation wheel;
a second intermediate member configured to be driven by the first intermediate member to rotate around the central axis, the second intermediate member disposed to be offset from the central axis of the rotation wheel on a side opposite the first intermediate member;
a counterweight device configured to be driven to move by the second intermediate member; and
a sliding guide fixed relative to a housing of the electric power tool, the sliding guide configured to guide the counterweight device to be driven to move only in the first direction.

2. The electric power tool according to claim 1, wherein a second offset distance radially between a second central axis of the second intermediate member and the central axis is equal to or greater than a first offset distance radially between a first central axis of the first intermediate member and the central axis.

3. The electric power tool according to claim 2, wherein the second offset distance is greater than the first offset distance.

4. The electric power tool according to claim 2, wherein the first and second intermediate members have first and second peripheries, respectively, that encircle the first and second central axes and extend without discontinuity along entire respective lengths of the first and second intermediate members, the first and second offset distances measured between the central axis and respective portions of the first and second peripheries that are radially closest to the central axis.

5. The electric power tool according to claim 1, wherein the counterweight device is driven by the second intermediate member to reciprocate in opposition to the spindle.

6. The electric power tool according to claim 1, wherein the sliding guide allows the counterweight device to be driven to slide in the first direction.

7. The electric power tool according to claim 6, wherein the sliding guide has two walls spaced apart from one another and protruding away from the sliding guide so as to define a sliding groove that extends in the first direction, the sliding groove configured to receive at least a portion of the counterweight device to position the counterweight device to slide within the sliding groove.

8. The electric power tool according to claim 1, wherein the counterweight device and the second intermediate member are structurally configured such that the second intermediate member slides relative to the counterweight device in a second direction perpendicular to the first direction.

9. The electric power tool according to claim 8, wherein the counterweight device defines an elongated hole that extends in the second direction, the elongated hole configured to receive at least a portion of the second intermediate member and allows the at least a portion thereof to slide within the elongated hole.

10. The electric power tool according to claim 1, wherein the spindle comprises an end engagement structure that engages with at least a portion of the first intermediate member such that the first intermediate member, when driven by the rotation wheel to revolve around the central axis, is configured to slide relative to the spindle in a second direction perpendicular to the first direction.

11. The electric power tool according to claim 10, wherein the end engagement structure defines a spindle elongated hole extending in the second direction, the spindle elongated hole is configured to receive the portion of the first intermediate member and allows the portion of the first intermediate member to slide within the spindle elongated hole.

12. The electric power tool according to claim 11, wherein the end engagement structure is integral with the spindle.

13. The electric power tool according to claim 1, further comprising a third intermediate member interposed between the spindle and the counterweight device, the third intermediate member configured to drive the second intermediate member to rotate around the central axis while being driven by the first intermediate member to rotate around the central axis.

14. The electric power tool according to claim 13, wherein the third intermediate member is supported within the housing of the electric power tool by a fourth intermediate member, the fourth intermediate member interposed between the spindle and the counterweight device and fixed relative to the housing.

15. The electric power tool according to claim 13, wherein the third intermediate member defines an opening configured to receive the first intermediate member in a pivotable manner relative to the third intermediate member.

16. The electric power tool according to claim 13, wherein the first intermediate member defines a peripheral surface that extends without discontinuity between the rotation wheel and the third intermediate member.

17. The electric power tool according to claim 16, wherein a first portion of the peripheral surface drives the spindle to reciprocate in the first direction and a second portion of the peripheral surface spaced axially from the first portion drives the third intermediate member to rotate around the central axis.

18. The electric power tool according to claim 1, wherein the electric power tool is a reciprocating electric power tool.

19. The electric power tool according to claim 1, wherein the counterweight device is not subjected to a force in a second direction perpendicular to the first direction.

20. The electric power tool according to claim 1, wherein the spindle is not subjected to a force in a second direction perpendicular to the first direction.

* * * * *